(12) United States Patent
Gonzalez Sanchez et al.

(10) Patent No.: US 9,535,310 B2
(45) Date of Patent: Jan. 3, 2017

(54) SECURITY COVER ON WEB CAMERAS WITH PARENTAL CONTROL

(71) Applicant: Jose Manuel González Sánchez, Alicante (ES)

(72) Inventors: Jose Manuel Gonzalez Sanchez, Alicante (ES); Torbenko Anatoliy, Alicante (ES)

( * ) Notice: Subject to any disclaimer, the term of this patent is extended or adjusted under 35 U.S.C. 154(b) by 0 days.

(21) Appl. No.: 14/897,486

(22) PCT Filed: Jun. 24, 2014

(86) PCT No.: PCT/ES2014/000112
§ 371 (c)(1),
(2) Date: Feb. 17, 2016

(87) PCT Pub. No.: WO2014/207272
PCT Pub. Date: Dec. 31, 2014

(65) Prior Publication Data
US 2016/0161830 A1   Jun. 9, 2016

(30) Foreign Application Priority Data

Jun. 24, 2013   (ES) .................................. 201300615

(51) Int. Cl.
| | |
|---|---|
| *G03B 11/04* | (2006.01) |
| *G06F 1/16* | (2006.01) |
| *H04N 5/225* | (2006.01) |
| *H04M 1/02* | (2006.01) |

(52) U.S. Cl.
CPC ........... *G03B 11/041* (2013.01); *G03B 11/048* (2013.01); *G06F 1/1656* (2013.01); *G06F 1/1686* (2013.01); *H04N 5/2257* (2013.01); *H04M 1/0264* (2013.01)

(58) Field of Classification Search
CPC ............................. G03B 11/041; G03B 11/048
See application file for complete search history.

(56) References Cited

U.S. PATENT DOCUMENTS

| | | | | |
|---|---|---|---|---|
| 7,114,862 | B2 * | 10/2006 | Huang | G03B 9/08 348/362 |
| 7,581,893 | B2 * | 9/2009 | Miramontes | H04M 1/0264 396/448 |
| 2005/0068423 | A1 | 3/2005 | Bear et al. | |
| 2007/0253705 | A1 * | 11/2007 | Ho | G03B 17/02 396/448 |
| 2007/0269202 | A1 * | 11/2007 | Forsyth-Martinez | G03B 11/00 396/429 |
| 2008/0304819 | A1 * | 12/2008 | Tolbert | G03B 17/18 396/448 |
| 2011/0115924 | A1 | 5/2011 | Yu | |

(Continued)

FOREIGN PATENT DOCUMENTS

| | | |
|---|---|---|
| CN | 201114394 | 9/2008 |
| CN | 101980099 | 2/2011 |

(Continued)

*Primary Examiner* — W B Perkey

(57) ABSTRACT

Shielding device for web cameras built into mobile devices such as smart-phones, tablets, netbooks and laptop computers providing such web cameras with a security cover to prevent unintentional or malicious recording of video or images. This security cover or lid allows for parental control through its activation via a driving elements which only the administrator or owner of the device possesses.

2 Claims, 1 Drawing Sheet

(56) References Cited

U.S. PATENT DOCUMENTS

| | | | | |
|---|---|---|---|---|
| 2011/0150456 A1* | 6/2011 | Hsu | ............... | G03B 11/043 396/448 |
| 2011/0195761 A1 | 8/2011 | Lee | | |
| 2012/0148227 A1* | 6/2012 | Schmit | ............... | G03B 11/043 396/448 |
| 2015/0009399 A1* | 1/2015 | Jonsson | ............... | G06F 1/1686 348/373 |
| 2015/0059251 A1* | 3/2015 | Rinner | ............... | G06F 1/1656 49/465 |
| 2016/0161830 A1* | 6/2016 | Gonzalez Sanchez | ............... | G06F 1/1686 396/448 |

FOREIGN PATENT DOCUMENTS

| | | |
|---|---|---|
| DE | 102005001274 | 7/2006 |
| ES | 1076643 | 4/2012 |
| ES | 1077518 | 8/2012 |
| WO | 2009137600 | 11/2009 |

\* cited by examiner

SECURITY COVER ON WEB CAMERAS WITH PARENTAL CONTROL

OBJECT OF THE INVENTION

The object of this invention is to provide mobile devices such as smart-phones, tablets, netbooks and laptop computers with a security cover for built-in web cameras to prevent unintentional or malicious recording of video and images. The present technical solution to the aforementioned problem focuses on hardware-based—instead of software-based—measures, thus giving the user the certainty that such measures are not being hacked through the use of malware. The shielding mechanism for cameras proposed in this invention allows for parental control of its activation, thus extending the merits of the currently available shielding devices for web cameras used in mobile devices both at home and at work.

TECHNICAL SECTOR

This invention relates generally to the industrial field of Telecommunications and more specifically to devices using image and video recording such as smart-phones, tablets, netbooks and laptop computers. It is equally applicable to other recording devices connected to the monitoring of goods and equipment and to alarm systems.

BACKGROUND OF THE INVENTION

Unfortunately, numerous cases of malicious recording of video or images have been reported. This has led to the development of various devices designed to prevent unwanted recording of images or video. On the one hand, several software-based solutions exist although they do not provide sufficient guarantees for end users, since safe operation of the software or of the software-based measures cannot be guaranteed. To solve this problem, several shielding devices that can be attached to the web cameras to obstruct their field of view have been developed. Such shielding devices can be locked in two positions, an open position and a closed position, and some of them are designed to be installed during the device manufacturing process. This is the case, for example, of the Microsoft patent US2005/0068423, "Method and system for capturing video on a personal computer", dated Mar. 31, 2005, in which users may use an actuator for mechanically opening a cover located in front of the camera. The utility model CN200721762, filed by Zhou Y, uses a switch installed in the webcam itself that cuts off the electrical power supply when the camera is not in use. Other devices link the opening of the shielding cover with the start of the recording process, thus offering a shielding device easily controllable by users. This is true of U.S. Pat. No. 7,581,893, "U-cover Camera Phone", dated Sep. 1, 2009. Patent US2011/0115924 "Image pickup device", filed by Primax Electronics, presents a camera shielding device based on a shielding cover in which the driving element is an electromagnet, but control takes place through video monitoring software. Patent CN101980099, dated Feb. 23, 2011, addresses this issue through the monitoring of opacity on a liquid crystal display.

On the other hand, there are other straightforward solutions to cover the lens of web cameras that can be easily incorporated into such devices as shown in patent application PCT WO2009/137600 "Computer, Pda or telephone lens cover", dated May 6, 2009. The utility model ES1077518 U "Web cameras protection device", filed by Longares Monreal on Aug. 3, 2012, presents a device with a sliding or swinging shielding cover. Additionally, the utility model U 2012000157 "Shielding device for web cameras built into desktop computers", filed by Guillermo Olivencia Cerezo on Feb. 20, 2012, simply describes a sliding shielding cover located in front of the camera lens.

There are no known shielding devices for web cameras allowing for parental control by users.

DESCRIPTION OF THE INVENTION

This invention relates to a shielding device for cameras built into mobile devices such as smart-phones, tablets, netbooks and laptop computers providing them with a security cover for built-in cameras to prevent unintentional or malicious recording of video and images. The shielding device proposed in this invention allows for parental control, thus extending the merits of the currently available shielding devices for web cameras used in mobile devices both at home and at work.

The security cover for web cameras comprising the object of this invention is preferably made of plastic material and presents a through aperture (2) FIG. 1 placed concentrically to the camera of the device to be protected, the diameter of such aperture being sufficient to prevent obstruction of the field of view when the camera is on. The security cover is attached to the device through conventional means, such as adhesive bonding. Inside the security cover there is a sheet made of a metallic material of a sort that can be attracted by a magnet, such as iron, nickel or cobalt alloys. This sliding cover is housed within the interior of the security cover and may be moved in a linear way since it slides into conventional hollow spaces in the interior of the security cover body. The sliding cover (3) can be moved to the open position, in which the aperture is exposed and the device camera can be used, FIG. 3, or to the closed position, where the aperture is closed and therefore the device camera cannot be used, FIG. 4.

The security cover on web cameras with parental control includes a driving element (4), this being a magnet; by placing this magnet on the security cover, we can use the magnetic attraction force between the magnet and the sliding cover to move the sliding cover. Thus, the aperture exposing the camera of the device we are monitoring can be closed, it being very difficult for other users to re-open the aperture without the driving element (4).

To lock the end positions of the sliding cover and prevent it from freely sliding when the device is moved, two magnets (5) have been built into the security cover in the end positions of the trajectory of the sliding cover, i.e., with the aperture exposing the camera lens open or with the aperture closed.

BRIEF DESCRIPTION OF THE DRAWINGS

In order to better understand the concepts described in this report drawings are attached, as examples only, with the relevant description of the figures for the proposed invention.

Description of Figures

Figure 1:
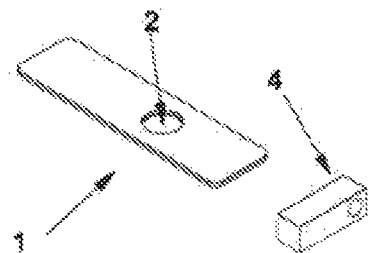

FIG. 1: Isometric view of the security cover (1) in which the through aperture (2) whereby the lens of the camera is exposed and the driving element (4) are visible.

Figure 2:
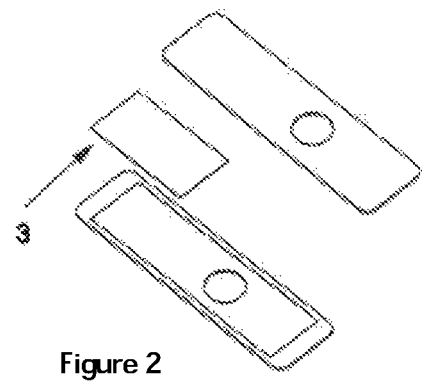

FIG. 2: Exploded isometric view of the security cover in which the sliding cover (3) is visible.

Figure 3:
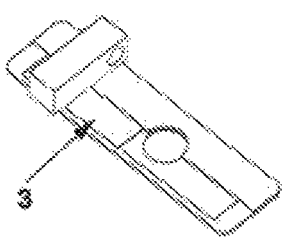

FIG. 3: Isometric view comprising a partial section of the front side of the security cover to show the position of the sliding cover (3), in which the aperture exposing the lens of the camera is not closed. The driving element located on the sliding cover is also visible.

Figure 4:
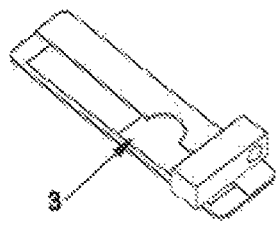

FIG. 4: Isometric view comprising a partial section of the front side of the security cover to show the position of the sliding cover (3), in which the aperture exposing the lens of the camera is closed. The driving element located on the sliding cover is also visible.

Figure 5:
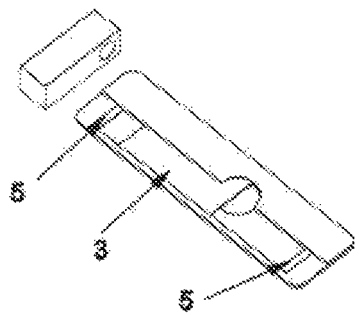

FIG. 5: Isometric view comprising a partial section of the front side of the security cover in which the sliding cover (3) can be seen closing half of the aperture. The magnets used to secure the position of the sliding cover (5) are visible at both ends of the sliding trajectory.

Figure 6:
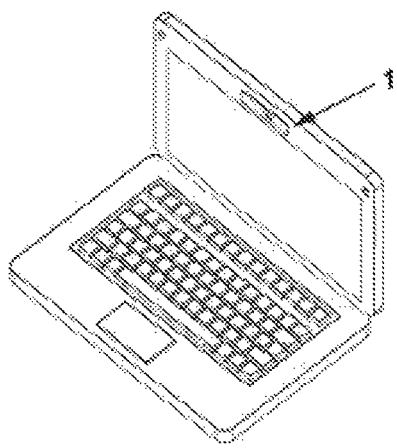

FIG. 6: Security cover (1) installed on the device.

DESCRIPTION OF THE PREFERRED DESIGN

The preferred design is described as follows by way of example, with the materials to be used for manufacture of the new folding container being independent to the object of the invention, as are the methods of application and all accessory details that arise, provided that they do not affect the essentials of the invention.

The preferred design method of the security cover on web cameras with parental control is provided:

The security cover is preferably made of plastic material and presents a through aperture (2) FIG. 1 placed concentrically to the camera of the device to be protected, the diameter of this aperture being sufficient to prevent obstruction of the field of view when the camera is on. The security cover is attached to the device through conventional means, such as adhesive bonding. Inside the security cover there is a sheet made of a metallic material that can be attracted by a magnet, such as iron, nickel or cobalt alloys. This sliding cover is housed within the interior of the security cover and may be moved in a linear way since it slides into conventional hollow spaces in the interior of the security cover body. The sliding cover (3) can be moved to the open position, in which the aperture is exposed and the device camera can be used, FIG. 3, or to the closed position, where the aperture is closed and therefore the device camera cannot be used, FIG. 4.

The security cover on web cameras with parental control includes a driving element (4), this being a magnet; by placing this magnet on the security cover, the magnetic attraction force between the magnet and the sliding cover can be used to move the sliding cover. Thus, the through aperture exposing the camera of the device we are monitoring can be closed, it being very difficult for other users to re-open the aperture without the driving element (4).

To lock the end positions of the sliding cover and prevent it from freely sliding when the device is moved, two magnets (5) have been built into the security cover in the end positions of the trajectory of the sliding cover, i.e., with the aperture exposing the camera lens open or with the aperture closed.

The invention claimed is:

1. Security cover or lid without electric drive for the shielding of cameras built into mobile devices such as smart-phones, tablets, netbooks and laptop computers to prevent unintentional or malicious recording of video and images when hacked through malware, characterized by allowing parental control of the camera by the guardian or administrator of the device through the use of a driving element (4) placed outside the security cover (1), thus preventing minors under guardianship or users in general from exposing the device camera if they do not have access to the driving element; the security cover is preferably made of plastic material and can be placed on any device, such as smart-phones, tablets or netbooks without the need of adjusting or tightening the cover to the device through conventional means such as straps; it features a through aperture (2) placed concentrically to the camera of the device to be protected, the diameter of this aperture being enough to prevent obstruction of the field of view when the camera is on; it includes a sliding cover (3) made of metallic material of a sort that can be attracted by a magnet, such as conventional iron, nickel or cobalt alloys; this sliding cover is housed within the interior of the security cover and may be moved in a linear way since it slides into conventional hollow spaces in the interior of the security cover body; parental control takes place by moving the sliding cover through magnetic attraction to a position where the aperture exposing the camera of the device to be protected is closed, via a driving element (4) consisting of a conventional magnet; and conventional means to install and attach the security cover to the device to be protected, such as adhesive bond; this adhesive bond allows the cover to be used on any devices irrespective of their size, since it does not use the relieved area or hollow space potentially existing between the lens of the camera and the device that contains it to keep the security cover in its position.

2. Security cover or lid as in claim 1 characterized by including means to prevent the sliding cover (3) from freely sliding when the device to which it is attached is moved, consisting of at least two magnets (5) located within the security cover at the end positions of the trajectory of the sliding cover, i.e., with the aperture exposing the camera lens open or with the aperture closed.

* * * * *